(12) United States Patent
Safar (10) Patent No.: US 10,321,730 B2
(45) Date of Patent: Jun. 18, 2019

(54) IMPACTPROOF HEAD PROTECTION DEVICE (71) Applicant: Samir Hanna Safar, San Diego, CA (US)

(72) Inventor: Samir Hanna Safar, San Diego, CA (US)

(73) Assignee: Samir Hanna Safar, San Diego, CA (US)

( * ) Notice: Subject to any disclaimer, the term of this patent is extended or adjusted under 35 U.S.C. 154(b) by 195 days.

(21) Appl. No.: 15/672,360

(22) Filed: Aug. 9, 2017

(65) Prior Publication Data
US 2019/0045870 A1 Feb. 14, 2019

(51) Int. Cl.
A42B 3/06 (2006.01)
A42B 3/10 (2006.01)
A42B 3/12 (2006.01)
B32B 5/18 (2006.01)
B32B 5/22 (2006.01)

(52) U.S. Cl.
CPC ............. A42B 3/125 (2013.01); A42B 3/063 (2013.01); A42B 3/10 (2013.01); B32B 5/18 (2013.01); B32B 5/22 (2013.01)

(58) Field of Classification Search
CPC .... A42B 3/00; A42B 3/04; A42B 3/06; A42B 3/10; A42B 3/12; A42B 3/16; A42B 3/063; A42B 3/0473; A42B 3/125; B32B 5/18; B32B 5/22; B32B 19/06; B32B 19/047; B32B 19/048; B32B 29/04; B32B 29/005; A63B 71/10; A63B 71/1291; F16F 13/00; B60N 2/42; B60N 2/4207; B60N 2/4214; B60N 2/4221; B60N 2/4228; B60N 2/4235; B60N 2/4242; A61B 5/6803; A41D 13/0512
USPC ....... 2/411, 413, 414, 425; 74/30, 46, 89.11, 74/89.17, 109, 126, 128, 130, 411.5, 422, 74/527, 530, 531, 532, 533, 534; 297/216.11, 216.12, 216.13, 216.14, 297/216.1, 216.2
See application file for complete search history.

(56) References Cited

U.S. PATENT DOCUMENTS 6,416,127 B1 * 7/2002 Galbreath, Jr. ...... B60N 2/4214
297/216.13
2016/0316847 A1 * 11/2016 Weber .................... A42B 3/125
2016/0366970 A1 * 12/2016 Lewis .................. A42B 3/0473

FOREIGN PATENT DOCUMENTS

WO WO-2015116750 A1 * 8/2015 ............. A42B 3/063

* cited by examiner

Primary Examiner — Khoa D Huynh
Assistant Examiner — Grace Huang
(74) Attorney, Agent, or Firm — Samir Hanna Safar (57) ABSTRACT The present invention relates to an impactproof head protection device. The device comprises of an outer shell, a flexible ring shaped elastomeric seal, an impact reduction layer and a base helmet. The impact reduction layer further comprises of an elastic net, on to which a plurality of impact reduction sub-assemblies are embedded. When the outer shell is subjected to an impact, the impact is conveyed to the impact reduction layer. The impact reduction sub-assemblies absorb the impact, and dissipate the same in the form of rotational motion of the microgears. The microgears stop rotating once all the absorbed energy is dissipated, and all the components of the impact reduction sub-assemblies once again revert to their original position on the elastic net.

9 Claims, 8 Drawing Sheets

IMPACTPROOF HEAD PROTECTION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The present invention belongs to the field of protective headgear and more particularly relates to a novel head protection device for use in sporting activities which involve possible traumatic and impactful injuries to the head.

BACKGROUND OF THE INVENTION

Concussions are one of the most common sports-related injuries. Injuries to the head and neck are the most catastrophic, and head injuries are the most common direct athletic cause of death. The risk of injuries to the head is present in various sports and physical activities, such as football, soccer, cricket, skiing, snowboarding, ice hockey, hockey, baseball, cycling, equestrian, car racing, to name a few.

Below are given some of the known prior art.

Patent application US 20160286883 entitled "Protective headgear" describes protective headgear for sports and methods of using such headgear. In one aspect, the headgear has an external head-protecting shell that is soft to reduce the risk of injuring other players. In another aspect, the headgear has a rear closure arrangement that includes a bridge component for ease of putting on the headgear and for added protection at the closure area of the rear closure arrangement. In another aspect, fit pads of different sizes are removeably attachable to a cheekbone extension member of the headgear to provide a proper fit to the wearer's cheekbone. A face mask is integrated with the headgear in some embodiments.

Patent application US 20130312166 entitled "Sports helmet" describes a sports helmet having a domed shell, and a forward peak each having a topside and an underside, said sports helmet being configured to co-operate with a faceguard for protecting the face of a wearer, wherein said peak comprises a proximal, rigid peak portion which is connected to the helmet main body and a distal, movable peak portion which is articulated on said proximal peak portion along a prescribed line of flexure, wherein said distal peak portion is capable of being deflected upwards when impacted by a moving ball or projectile.

Patent application US 20040154080 entitled "Protective headgear" discloses a protective headgear device that comprises a circumferential member composed of a foam material, having an interior that generally conforms to the shape of one's head. The circumferential member has a first opening for viewing and a second open through which the neck of the user extends. A plurality of internal pads is secured to an interior surface of the circumferential member, and the pads are spaced apart from one another, to protect predetermined sensitive areas of the head. Impact plates are affixed to the interior surface of outer shell, and each impact plate is disposed between the circumferential member and a corresponding internal pad. The impact plates supplement the protection of the internal pads and outer shell for absorbing trauma forces applied to the headgear.

U.S. Pat. No. 6,266,827 entitled "Impact protection headguard" describes impact protection headguards for athletics and in particular soccer players. In one embodiment, a protective headguard is provided that includes a central pad for covering a portion of a forehead of a wearer. The central pad has a first side and a second side, and a first and second padded rib extending from each side of the central pad. The distal ends of the first and second padded ribs on each side are connected to form side portions that extend rearward from the central pad for covering sides of the head of the wearer. The headguard also includes a rear pad for covering an occipital bone of the wearer and an adjustment strap system which secures the side portions of the central pad to the rear pad.

U.S. Pat. No. 5,392,468 entitled "Protective head gear for martial arts activities" discloses a head gear with four main components which provide increased protection to vulnerable parts of the head and neck. The main components are 1) a head mask, 2) a face guard for protecting facial areas, 3) a neck guard for protecting the back of the neck and 4) a cap for protecting the top of the head.

U.S. Pat. No. 3,600,714 entitled "Hydraulic helmet" describes a helmet including an outer resiliently deformable shell, an inner compressible liner contacting the user's head, and an intermediate portion positioned between the shell and liner including a hydraulic cushioning assembly. The assembly includes a plurality of spaced elastic cells and an elastic sump generally coextensive with the interior of the shell and means connecting some of the cells to other of the cells and/or to the sump for intercommunication of the hydraulic fluid there between. The connecting means includes constrictive passageways to restrict the fluid flow there through. The interaction of the deformable shell hydraulic assembly and compressible liner results in the dissipation, absorption and distribution of the energy of an external blow delivered to the shell.

U.S. Pat. No. 3,609,764 entitled "Energy absorbing and sizing means for helmets" describes a system for absorbing energy to avoid the detrimental effects of impacts in protective equipment such as helmets comprising a plurality of first chambers located on the inside surface of the helmet for positioning adjacent the head of the wearer. A substantially non-compressible fluid is included within these first chambers, and conduits connect the first chambers with corresponding second chambers. Upon impact, fluid is displaced to the second chambers, and, due to the design of the chambers, the displaced fluid is returned to the first chambers when the force of the impact is removed. Sizing means useful with the energy absorbing means or in other applications are located on the interior of the helmet surface. The sizing means include expandable compartments, and valves are associated with these compartments whereby a user of the helmet can place the helmet on his head after which air is introduced into the compartments until a proper fit is achieved. Energy absorbing pads are preferably located within the compartments to serve as additional safeguards under high impact conditions.

In a publication entitled "Angular Impact Mitigation System for Bicycle Helmets to Reduce Head Acceleration and Risk of Traumatic Brain Injury", NIH Accid Anal Prev. 2013 October; 59: 109-117, Hansena et al describe a system for impact mitigation. The Angular Impact Mitigation (AIM) system for bicycle helmets developed employs an elastically suspended aluminum honeycomb liner to absorb linear acceleration in normal impacts as well as angular acceleration in oblique impacts.

The standard football-helmet format of a polycarbonate shell with internal foam padding is now replaced by a flexible bonnet that conforms to the wearer's head and is separated from the external plastic shell by a set of 18 hollow thermoplastic shock absorbers. On impact, these puck-shaped devices compress to absorb the energy of the hit. Theoretically, this reduces the jarring of the head inside the helmet, thus reducing the likelihood of brain injuries.

Headgears for ski and snowboard are typically made from polycarbonate shells molded with shock-absorbing polystyrene foam. This "in-mold" construction eliminates the need for glued-in padding. In baseball, a traditional batting helmet, comprising a hard ABS plastic shell encasing soft foam padding to withstand baseball impacts at great speeds.

Some bicycle helmets involve an interior lining made of crushable expanded polystyrene (EPS) encased in a hard plastic shell. High-end bicycle helmets which have air vents, are made using the so-called in-mold production method, i.e. the EPS is basically cooked into its polycarbonate shell during production, which allows for a lighter product. The major drawback of EPS helmets is that they can only sustain one impact. After that, the foam lining is crushed, and the helmet is useless.

Helmets used in ice hockey involve wearing a custom-made fiberglass mask. These days the mode in masks is the so-called hybrid mask, also known as the mage-style (mask+cage). These combine resilient shells made of high-grade fiberglass and resin with a steel face-guarding cage and interior foam padding that absorbs impact. Earlier, riding-headgear employed shock-absorbing foam linings. Today, riding helmets consist of impact-negating foam paired with external shells made from hard plastics, carbon fiber, or more traditional materials like velvet or suede.

Protection for automotive racers comprises of the Head and Neck Support (HANS) device. Like a pair of football shoulder pads, the device slips around the driver's neck and then attaches to the driver's helmet, so that the head and body move as one in a crash.

Despite various improvements and progress in the field, some of the major obstacles that still exist, such as not having an impactproof, shock absorbing, reliable, light weight and reusable headgear that can offer good protection to a user. Accordingly, improvements are needed in the existing methods and structures that negate the above shortcomings in the existing systems.

SUMMARY OF THE INVENTION

The purpose and methodology of all the above inventions that are part of prior art do not envisage the unique embodiment of an impactproof head protection device comprising of an outer shell, a flexible elastomeric seal, an impact reduction layer and a base helmet, wherein the outer shell is attached to the base helmet by way of a plurality of fasteners and an impact absorbing fastener member, that are sandwiched between the outer shell and the base helmet.

The scope of the invention is to be determined by the terminology of the following description, claims, drawings and the legal equivalents thereof. The present invention may be summarized, at least in part, with reference to its objectives.

It is therefore a primary objective of the present invention to provide a head gear that can offer reliable protection to a user from high speed impact and similar injuries.

Another objective of the present invention is to provide a head protection device that is light in weight and easy for the user to wear.

Another objective of the present invention is to provide a head protection device that is reusable and does not get destroyed during a high impact or collision.

The invention described herein provides a head protection device that can be worn by a user while performing any activity which involves the potential risk of impact or injury to the head. The device comprises of an outer shell, a flexible elastomeric seal (shaped as a ring and attached to the inside rim at the bottom of the outer shell), an impact reduction layer and a base helmet. The outer shell is attached to the base helmet by way of a plurality of fastener pins and a plurality of impact absorber fastener members, which are sandwiched between the outer shell and the base helmet. The impact reduction layer further comprises of an elastic net, on to which a plurality of impact reduction sub-assemblies are embedded. Each impact reduction sub-assembly comprises a hemi-spherical impact-absorber with slits, a trio of penta-pieces, and a pair of gear units. Each gear unit comprises a microgear, a piston base, a piston lever, a cam disc and a microgear rotation stopper, enclosed within a gear unit casing.

When the outer shell is subjected to an impact, the impact is conveyed to the impact reduction layer. The impact reduction sub-assemblies provided on the elastic net of the impact reduction layer absorb the impact. This is achieved in the following manner. The hemi-spherical impact-absorbers with slits, expand in diameter as a result of the impact (hit), and in the process they push against the penta-pieces, which in turn push the gear units. Within the gear units, this push is conveyed to the piston base. The piston lever which is pivotally mounted on the piston base, engages with the cam disc such that the pivotal movement of the piston lever induces rotational movement of the microgears. The microgears stop rotating once all the absorbed energy is dissipated, and all the components of the impact reduction sub-assemblies once again revert to their original position on the elastic net.

The above summary is intended to illustrate exemplary embodiments of the invention, which will be best understood in conjunction with the detailed description to follow, and are not intended to limit the scope of the invention.

Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

LIST OF REFERENCE NUMBERING 10 labels an impactproof head protection device.
20 labels an outer shell
21 labels a plurality of holes on the outer shell 20
30 labels a ring shaped, elastomeric seal
40 labels an impact reduction layer
41 labels a hemi-spherical impact absorber with slits
42 labels an elastic net
43 labels a penta-piece
44 labels a gear unit
45 labels a gear unit casing
46 labels a piston lever
47 labels a piston base
48 labels a cam disc
49 labels a microgear
50 labels a base helmet
51 labels slits in the hemi-spherical impact absorber 41
60 labels a plurality of fastener pins
65 labels an impact absorber fastener member
66 labels a microgear rotation stopper
67 labels a plurality of cavities in the penta-piece 43
68 labels a leg member of the impact absorber fastener member 65

DETAILED DESCRIPTION OF THE INVENTION

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

The following description is presented to enable any person skilled in the art to make and use the invention, and is provided in the context of particular applications of the invention and their requirements. The invention described herein provides a novel impactproof head protection device that can be worn by a user while performing any activity which involves the potential risk of impact or injury to the head.

The impactproof head-protection device comprises:
an outer shell having an external surface and an internal surface;
a flexible ring shaped elastomeric seal non-removably attached to the internal surface of the outer shell along a peripheral rim;
an impact reduction layer,
  said impact reduction layer comprising:
  an elastic net,
  a plurality of impact reduction sub-assemblies embedded on said elastic net,
  wherein a member of the plurality of impact reduction sub-assemblies further comprises at least one hemi-spherical impact-absorber with slits, at least one penta-piece, and at least one gear unit,
  and wherein each penta-piece is characterized by a predetermined number of edges, and wherein each gear unit further comprises a microgear, a piston base, a piston lever, a cam disc and a microgear rotation stopper, enclosed within a gear unit casing, the piston lever being mounted on the piston base and the piston base capable of linear movement on being pushed by an edge of the penta-piece;
and a base helmet,
wherein (i) the impact reduction layer is positioned below the outer shell and above the base helmet,
(ii) the outer shell is secured to the base helmet by means of a plurality of fastener pins and impact absorber fastener members; and
(iii) the impact energy applied to the external surface of the outer shell is conveyed to the impact reduction layer and dissipated by way of rotational motion of the plurality of microgears.

Any number of hemi-spherical impact-absorbers with slits, penta-pieces, and gear units may be arranged to form one impact reduction sub-assembly.

Figure 1:
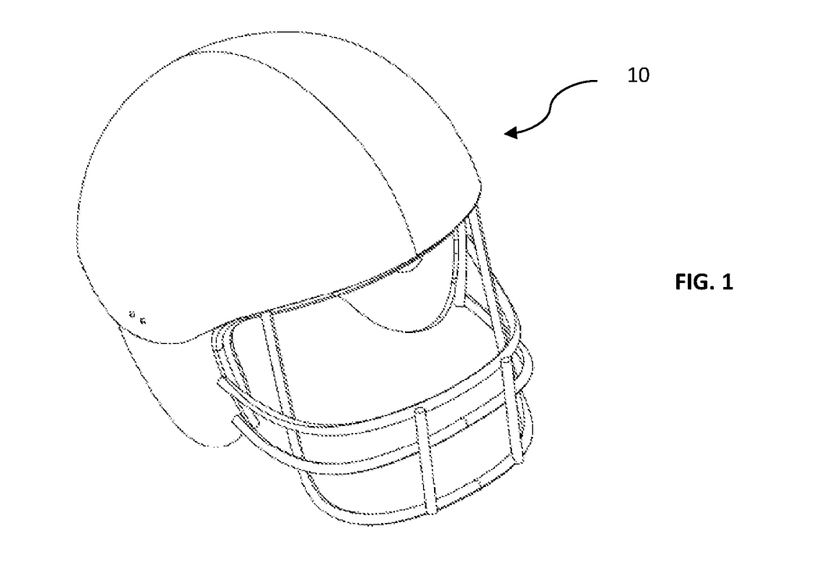
FIG. 1 is an illustrative diagram depicting the impactproof head protection device according to the present invention.
Figure 2:
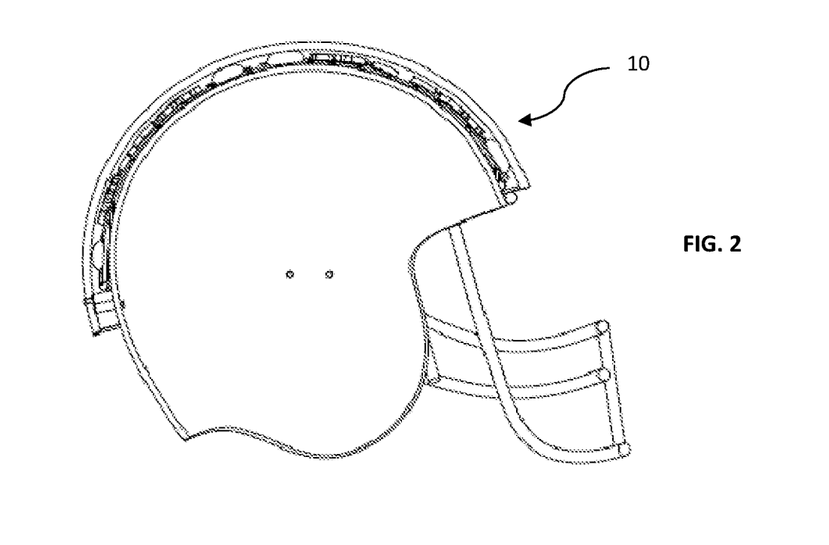
FIG. 2 is an illustrative diagram depicting a cross-sectional side view of the impactproof head protection device according to the present invention.

The present invention is described with reference to accompanying FIG. 1, wherein 10 depicts an embodiment of the impactproof head protection device. Referring to FIG. 2, a cross-sectional side view of the impactproof head protection device 10 is depicted.

Figure 3:
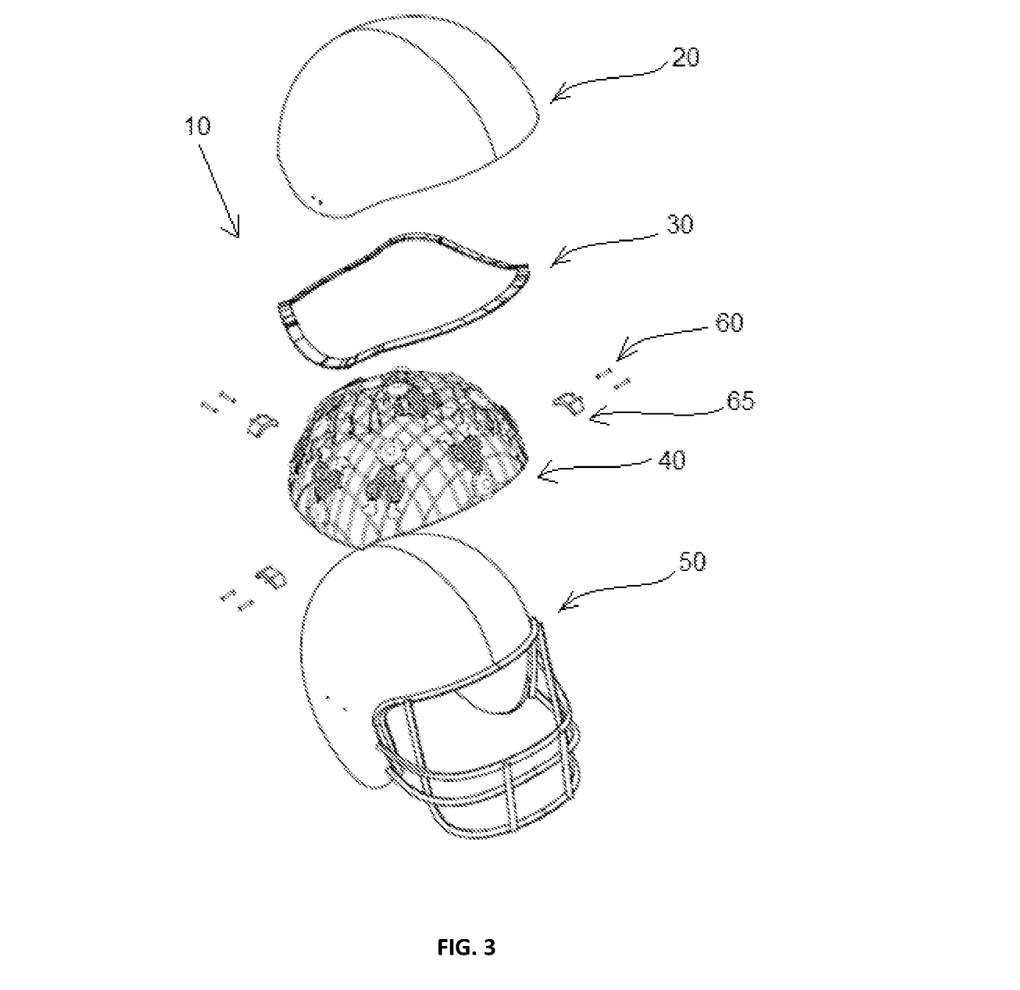
FIG. 3 is an illustrative exploded view of the impactproof head protection device according to the present invention.

FIG. 3 depicts an illustrative exploded view of the impactproof head protection device 10. Accordingly the head protection device 10 comprises of an outer shell 20, an elastomeric seal 30, an impact reduction layer 40, and a base helmet 50. The outer shell 20 has an outer surface that is exposed to potential external impacts and an inner surface, which is directed towards a user's head. The elastomeric seal 30 runs along the inner surface of the outer shell. It is made of a resilient material such as rubber. It is shaped like a circular ring and runs across the peripheral edge of the outer shell. The function of the elastomeric seal 30 is to provide a protective cover to the impact reduction layer 40 from external dirt that may get lodged in. Positioned beneath the elastomeric seal 30, is the impact reduction layer 40. The impact reduction layer 40 is positioned above the base helmet 50. The configuration comprising of the outer shell 20, the elastomeric seal 30 and the impact reduction layer 40, is secured by fastening means such as a plurality of fastener pins 60 and the impact absorber fastener members 65, to the base helmet 50.

Figure 4:
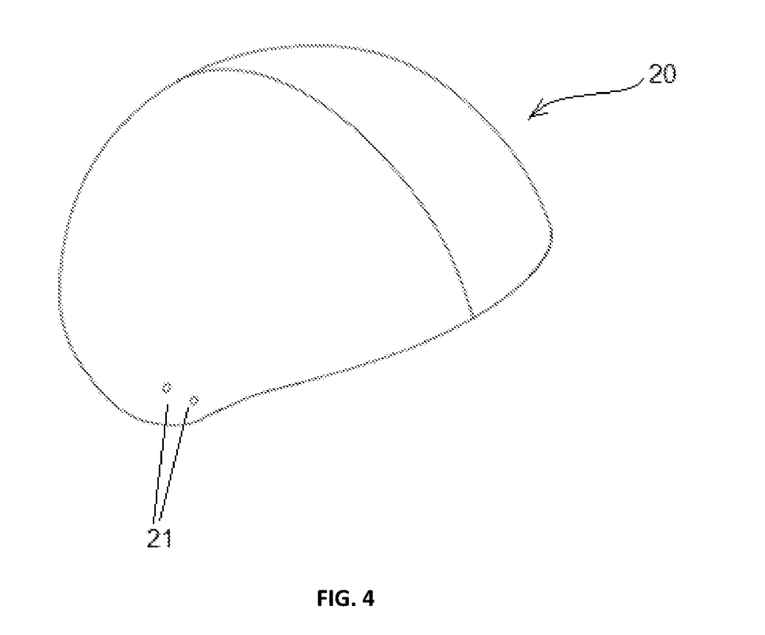
FIG. 4 is an illustrative diagram depicting an outer shell.

FIG. 4 represents the outer shell 20. A plurality of holes 21 are provided on the outer shell 20 for engaging with fastening means (60 and 65, not shown in FIG. 4) to secure it with the base helmet 50. The fastener pins 60 are preferably made of metal and pass through the plurality of holes 21 and the impact absorber fastener members 65.

Figure 5:
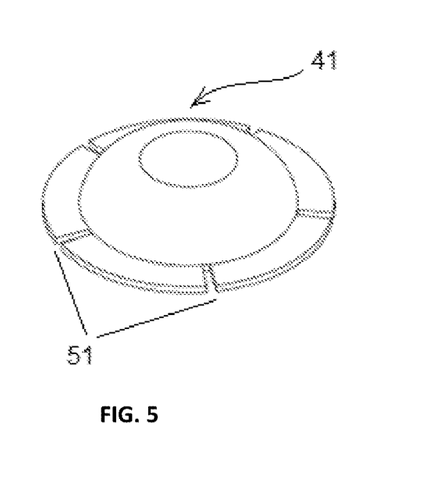
FIG. 5 is an illustrative diagram depicting a hemi-spherical impact-absorber with slits.

FIG. 5 represents a hemi-spherical impact-absorber 41 with slits, 51. A flat ring is provided on an outer circular peripheral edge of the hemi-spherical structure and is characterized with a plurality of slits 51. When the impact is transmitted from the outer shell via to the impact reduction layer, the plurality of hemi-spherical impact-absorbers with slits, experience the impact and as a result, get flattened temporarily and expand diametrically. The slits 51 provide the necessary space for expansion. Preferably the hemi-spherical impact-absorber 41 is made of an elastomeric or resilient material such as rubber, by way of example. The impact-absorber 41 may be provided in any geometric shape and not necessarily hemi-spherical, although the hemi-spherical shape is preferred. The flat peripheral ring of the impact-absorber 41 ensures that it can be positioned and affixed properly on the elastic net 42 (described subsequently in FIG. 7).

Figure 6:
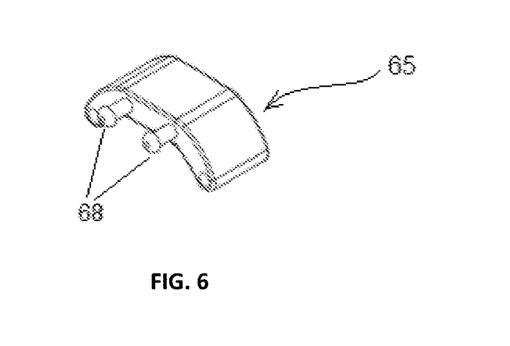
FIG. 6 is an illustrative diagram depicting the fastener pins coupled with the impact absorber rubber member.

FIG. 6 represents a fastening means used to couple the outer shell 20 with the base helmet 50. The impact absorber fastener member 65 has a pair of leg members 68. Preferably, the impact absorber fastener member 65 is made of resilient material such as rubber. These may be provided in different pluralities and positions.

Figure 7:
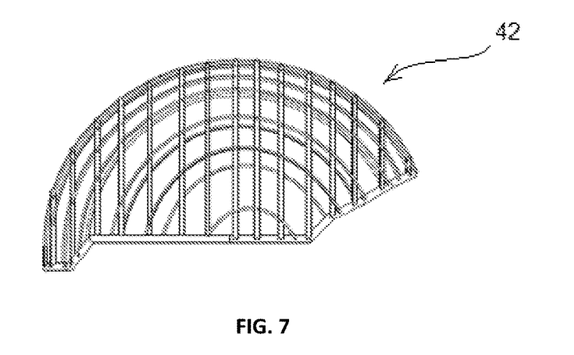
FIG. 7 is an illustrative diagram depicting an elastic net.
Figure 10:
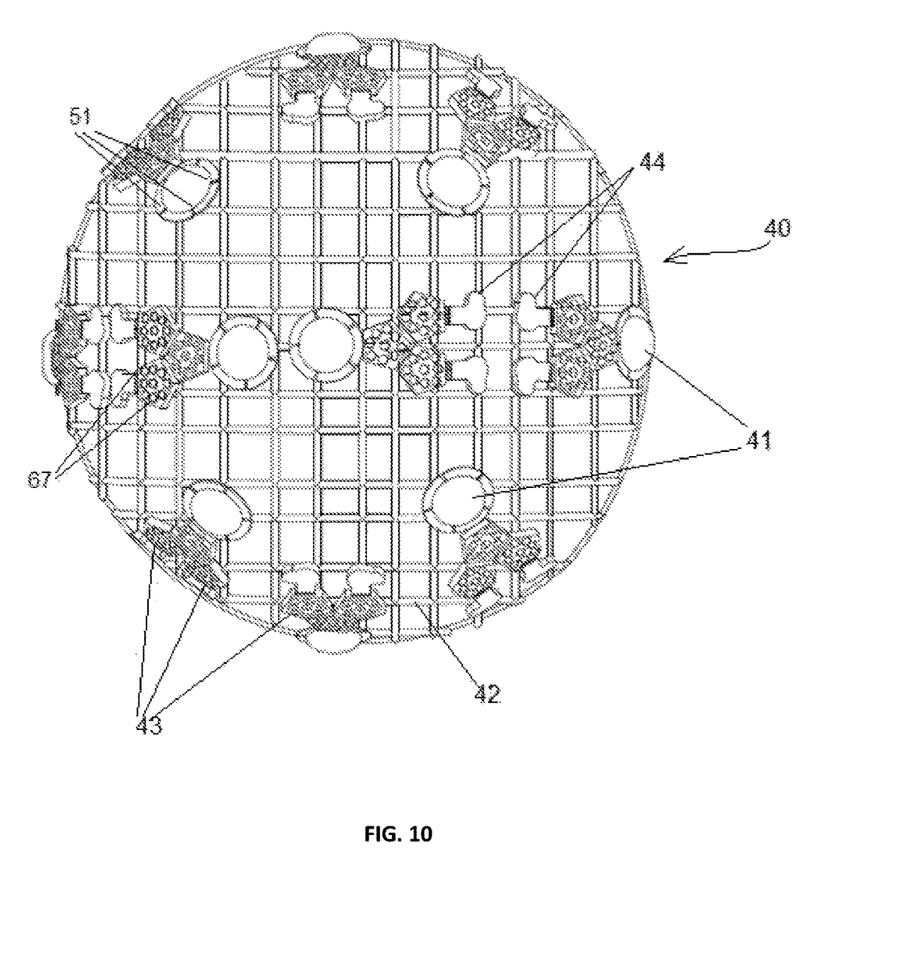
FIG. 10 depicts a view of the elastic net with impact reduction sub-assemblies embedded.
Figure 11A:
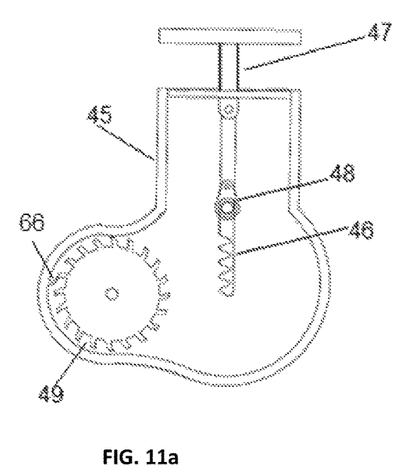
FIGS. 11a, 11b, 11c, 11d represent different positions of the components of an impact reduction sub-assembly during an impact.
Figure 11B:
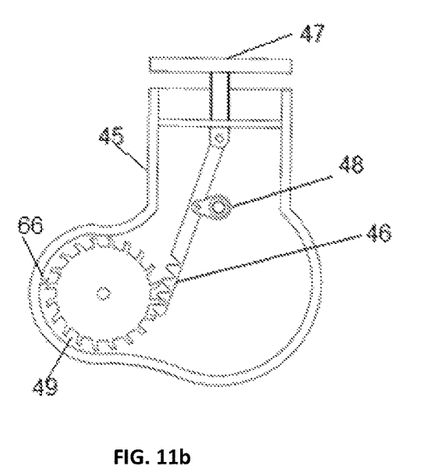
Figure 11C:
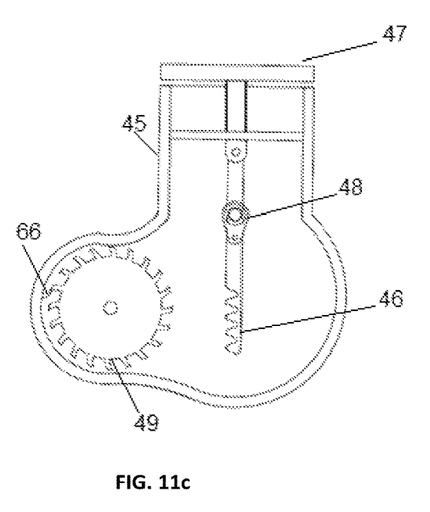
Figure 11D:
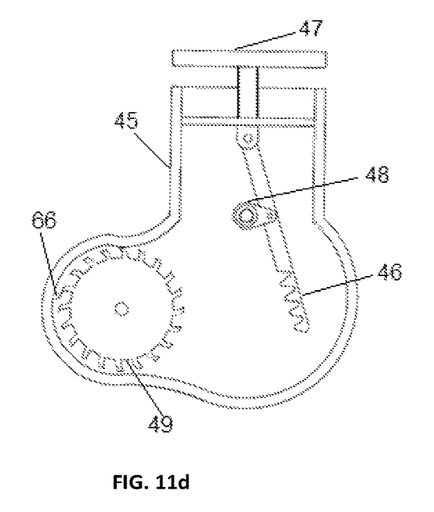

FIG. 7 represents an elastic net 42, which is provided in a criss-cross pattern to form a core base layer for the impact reduction layer 40. In the FIG. 7, only the elastic net 42 is depicted. A plurality of impact reduction sub-assemblies are embedded on the elastic net 42, as shown in FIG. 10. The elastic net 42 is characterized with a configuration adapted to hold the plurality of impact reduction sub-assemblies and revert the plurality of impact reduction sub-assemblies back to original position after experiencing an impact on the outer shell 20.

Figure 8A:
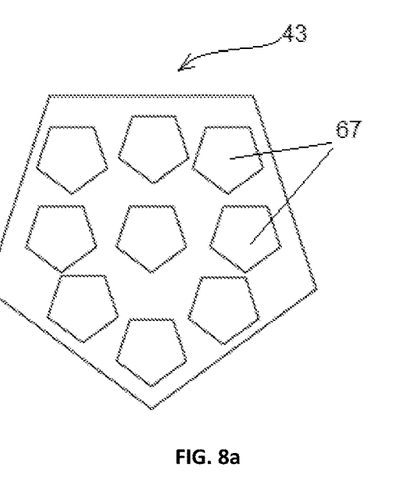
FIG. 8a depicts a top view of a penta-piece.
Figure 8B:
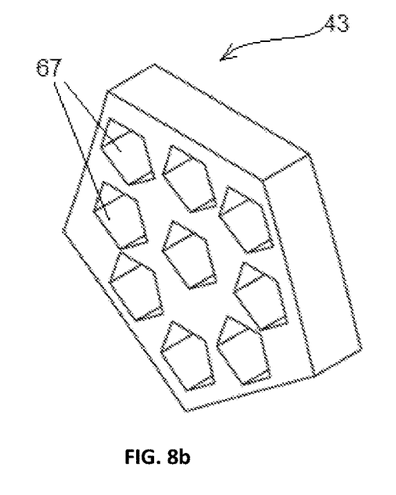
FIG. 8b depicts a side perspective view of a penta-piece.

FIG. 8a and FIG. 8b represent a top view and a side perspective view of a penta-piece 43 respectively. The penta-piece 43 is a pentagon shaped member that is affixed on the elastic net 42 and capable of forward sliding motion when pushed by the hemi-spherical impact absorber 41. Each penta-piece 43 is provided with a plurality of cavities of predefined shape, size and pattern, designated as 67. As illustrated in FIG. 8a and FIG. 8b, the cavities are pentagon shaped in an exemplary embodiment. However the same effect can be achieved by cavities of any other shape as well. Preferably, the penta-pieces are made of aluminium or any other light material. The cavities are provided to absorb the impact energy.

Figure 9A:
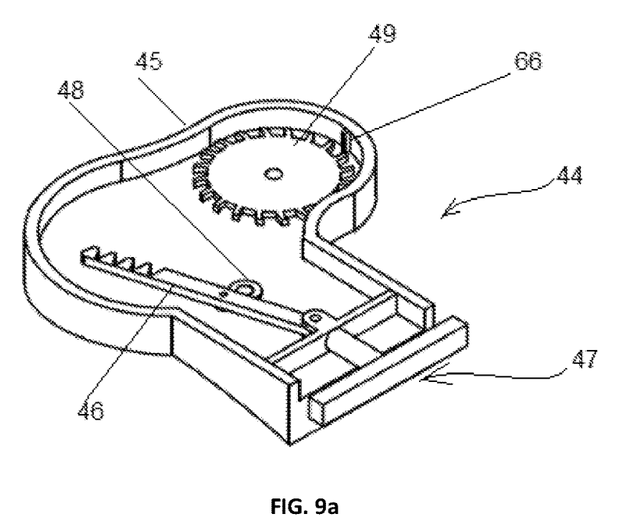
FIG. 9a is a cross-sectional perspective view of a gear unit.

FIG. 9a represents a cross-sectional perspective view of a gear unit 44. The gear unit 44 comprises of a microgear 49, a piston base 47, a piston lever 46, a microgear rotation stopper 66 and a cam disc 48, enclosed within a gear unit casing 45. The piston lever 46 is pivotly mounted on the piston base 47, and supported centrally above the cam disc 48. The upper portion of the piston lever 46 has a serrated edge to engage with the microgear 49. A finger like extruding member, designated as microgear rotation stopper 66, is provided on a predetermined position the inner edge of the gear unit casing 45, to just slightly engage with the microgear 49 at one point. The function of the microgear rotation stopper 66 is to not allow the microgear 49 to rotate in the reverse direction. The microgear rotation stopper 66 also prevents any unnecessary rotation of the microgear 49, unless there is an impact on the outer shell.

The gear unit casing 45 and the piston base 47 are preferably made of a plastic material. The piston lever 46, the microgear 49 are preferably made of a metal or a metal alloy such as brass.

Figure 9B:
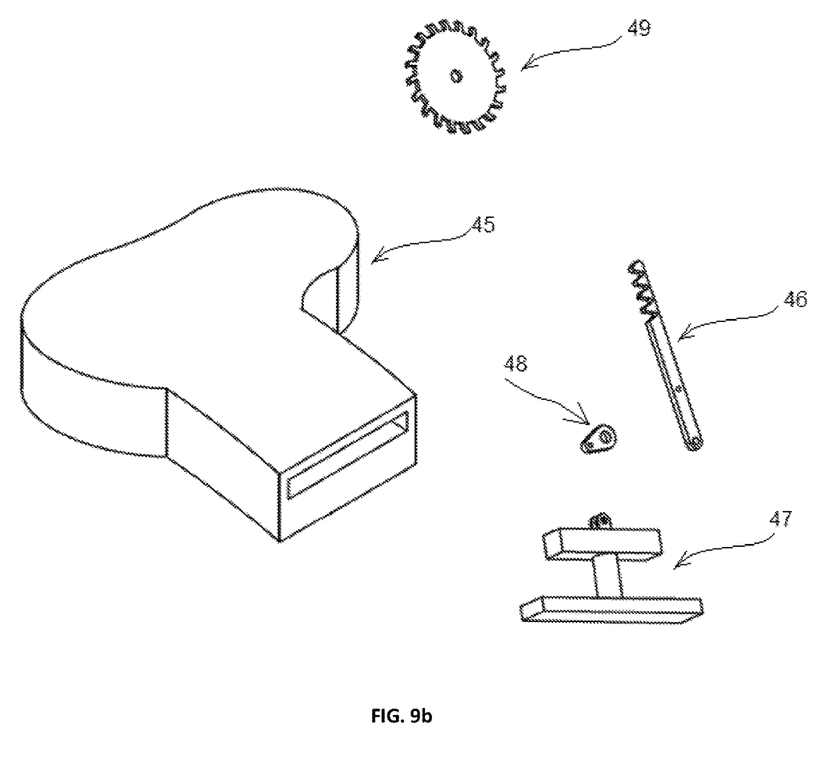
FIG. 9b depicts the individual components of a gear unit.

FIG. 9b represents individual components of a gear unit. The gear unit comprises of a microgear 49, a piston base 47, a piston lever 46, and a cam disc 48, enclosed within a gear unit casing 45.

FIG. 10 represents a top view of the impact reduction layer 40. The impact reduction layer 40 comprises of an elastic net 42. A plurality of impact reduction sub-assemblies are closely embedded on the elastic net 42 such that the entire surface of the elastic net 42 is covered. These may be embedded removably or non-removably. A securing means such as for example, a Velcro fastener or an adhesive may be used. Each member of the plurality of impact reduction sub-assemblies comprises of at least one hemi-spherical impact-absorber with slits 41, at least one penta-piece 43, and at least one gear unit 44. As depicted in FIG. 10, in a preferred embodiment of the invention, each impact reduction sub-assembly comprises of two hemi-spherical impact-absorber with slits, three penta-pieces and two gear units. This combination is exemplary, and several such configuration or patterns can be used to achieve the same effect.

FIGS. 11a, 11b, 11c and 11d depict the various positions within the gear unit 44, after an impact is conveyed by the push of an edge of the penta-piece. As the penta-piece edge pushes the piston base 47, the piston lever 46, which is pivotly mounted on the piston base 47, moves along with the cam disc 48 to engage with the microgear 49 and thereby cause rotation of the microgear 49. The microgear 49 continues to rotate until all the impact energy is dissipated. The microgear rotation stopper 66, which is provided on a predetermined position the inner edge of the gear unit casing 45 prevents the microgear 49 from rotating in a reverse direction, and also avoids any unnecessary rotation of the microgear 49, unless an impact is experienced. This is in order to ensure that the microgear 49 does not rotate on its own unless it is engaged by the piston lever 46. The microgear rotation stopper 66 just slightly touches with the microgear 49, which slows down the rotational movement of the microgear 49.

As depicted in FIGS. 11a through 11d, one microgear is shown in each gear unit. However, this should not be construed as limiting the present invention. A plurality of microgears can also be used to achieve the same effect.

After all the impact energy is dissipated, the plurality of impact reduction sub-assemblies once again revert to their original position on the elastic net. In alternate embodiments, the elastic net may be made of any resilient material, such as rubber, or a polymer.

In a preferred embodiment, all the components of the impact reduction layer i.e the hemi-spherical impact-absorbers, the penta-pieces and the impact-reduction sub-assemblies have a slightly curved shape in order to conform with the curvature of the base helmet.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed. In this application, the terminology 'embodiment' can be used to describe any aspect, feature, process or step, any combination thereof, and/or any portion thereof, etc.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

I claim:

1. An impactproof head-protection device comprising:
   an outer shell having an external surface and an internal surface;
   a flexible ring shaped elastomeric seal non-removably attached to the internal surface of the outer shell along a peripheral rim;
   an impact reduction layer;
     said impact reduction layer comprising:
       an elastic net,
       a plurality of impact reduction sub-assemblies embedded on said elastic net,
       wherein the elastic net is characterized with a configuration adapted to hold the plurality of impact reduction sub-assemblies and revert the plurality of impact reduction sub-assemblies back to original position after experiencing an impact on the outer shell,
       wherein a member of the plurality of impact reduction sub-assemblies further comprises at least one hemi-spherical impact-absorber with slits, at least one penta-piece, and at least one gear unit,
       and wherein each penta-piece is characterized by edges,
       and wherein each gear unit further comprises a microgear, a piston base, a piston lever,
   a cam disc and a microgear rotation stopper, enclosed within a gear unit casing, the piston lever being mounted on the piston base and the piston base capable of linear movement on being pushed by an edge of said edges of the penta-piece;
   and a base helmet,
   wherein (i) the impact reduction layer is positioned below the outer shell and above the base helmet,
   (ii) the outer shell is secured to the base helmet by means of a plurality of fastener pins and impact absorber fastener members; and
   (iii) the impact energy applied to the external surface of the outer shell is conveyed to the impact reduction layer and dissipated by way of rotational motion of each microgear.

2. The impactproof head-protection device as claimed in claim 1, wherein each impact reduction sub-assembly comprises of one hemi-spherical impact-absorber with slits, three penta-pieces, and two gear units.

3. The impactproof head-protection device as claimed in claim 1, wherein the plurality of impact reduction sub-assemblies is non-removably attached to the elastic net.

4. The impactproof head-protection device as claimed in claim 1, wherein the rotation of the microgear in the plurality of impact reduction sub-assemblies is unidirectional.

5. The impactproof head-protection device as claimed in claim 1, wherein each impact reduction sub-assembly comprises a plurality of microgears.

6. The impactproof head-protection device as claimed in claim 1, wherein the rotation of each microgear is initiated by engagement with the piston lever, and controlled by the microgear rotation stopper.

7. The impactproof head-protection device as claimed in claim 1, wherein each penta-piece is characterized by a plurality of cavities of predefined size, shape and pattern.

8. The impactproof head-protection device as claimed in claim 1, wherein each hemi-spherical impact-absorber with slits is provided with a peripheral flat ring.

9. The impactproof head-protection device as claimed in claim 1, wherein the members of the plurality of impact reduction sub-assemblies have a slightly curved shape in order to conform with the curvature of the base helmet.

* * * * *